United States Patent
Shimada et al.

(10) Patent No.: US 6,987,731 B2
(45) Date of Patent: Jan. 17, 2006

(54) COMMUNICATION SYSTEM PREFORMING CONTROL OF INFORMATION BETWEEN A TERMINAL DEVICE AND A NETWORK SIDE DEVICE INCLUDING BUFFER MANAGEMENT

(75) Inventors: Nagao Shimada, Kawasaki (JP); Tomohiro Shinomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 887 days.

(21) Appl. No.: 09/932,599

(22) Filed: Aug. 17, 2001

(65) Prior Publication Data

US 2002/0075888 A1    Jun. 20, 2002

(30) Foreign Application Priority Data

Dec. 18, 2000    (JP)    ............................... 2000-383645

(51) Int. Cl.
    H04J 1/16    (2006.01)
(52) U.S. Cl. .................... 370/235; 370/412; 370/395.1
(58) Field of Classification Search ................ 370/230, 370/235, 236.1, 236.2, 412, 421, 449, 229, 370/451, 238, 395.1
    See application file for complete search history.

(56) References Cited

U.S. PATENT DOCUMENTS

| | | | | |
|---|---|---|---|---|
| 5,787,072 A | * | 7/1998 | Shimojo et al. ............. | 370/231 |
| 5,926,478 A | * | 7/1999 | Ghaibeh et al. ........ | 370/395.51 |
| 5,938,749 A | * | 8/1999 | Rusu et al. ................... | 710/54 |
| 6,259,696 B1 | * | 7/2001 | Yazaki et al. ........... | 370/395.21 |
| 6,424,656 B1 | * | 7/2002 | Hoebeke ...................... | 370/412 |
| 6,778,557 B1 | * | 8/2004 | Yuki et al. ................... | 370/468 |
| 6,791,984 B2 | * | 9/2004 | Shimada et al. .......... | 370/395.4 |

FOREIGN PATENT DOCUMENTS

JP    10242891    9/1998

* cited by examiner

*Primary Examiner*—Ricky Ngo
*Assistant Examiner*—Nittaya Juntima
(74) *Attorney, Agent, or Firm*—Katten Muchin Rosenman LLP

(57) ABSTRACT

There is provided a communication system directed to inhibiting degradation of the efficiency of transmission of user information and improving the communication quality. A correspondence table management unit creates a correspondence table based on table forming information. A buffer status value acquiring unit acquires a buffer status value of a buffer that issues a transmission event. A notice information setting unit compares a size relation between status information about past buffer status values for the buffer and a current buffer status value acquired, and sets notice information on a bit basis. A terminal-side notice information management memory stores and manages the notice information as the status information. A notice information sending unit sends the notice information to notify an upper device of the buffer status. A table forming information sending unit sends the table forming information. A control-side notice information management memory receives and manages the notice information. A buffer status recognizing unit recognizes the buffer status from the content of the control-side notice information management memory.

5 Claims, 22 Drawing Sheets

Ta CORRESPONDENCE TABLE

| IN-BUFFER INFORMATION AMOUNT | BUFFER STATUS VALUE |
|---|---|
| 0 | 0 |
| 1~10 | 1 |
| 11~100 | 2 |
| 101~500 | 3 |
| 501~1000 | 4 |
| 1001~2000 | 5 |
| 2001~4000 | 6 |
| 4001 OR MORE | 7 |

(HIERARCHICAL NUMBER N=8)

FIG. 8

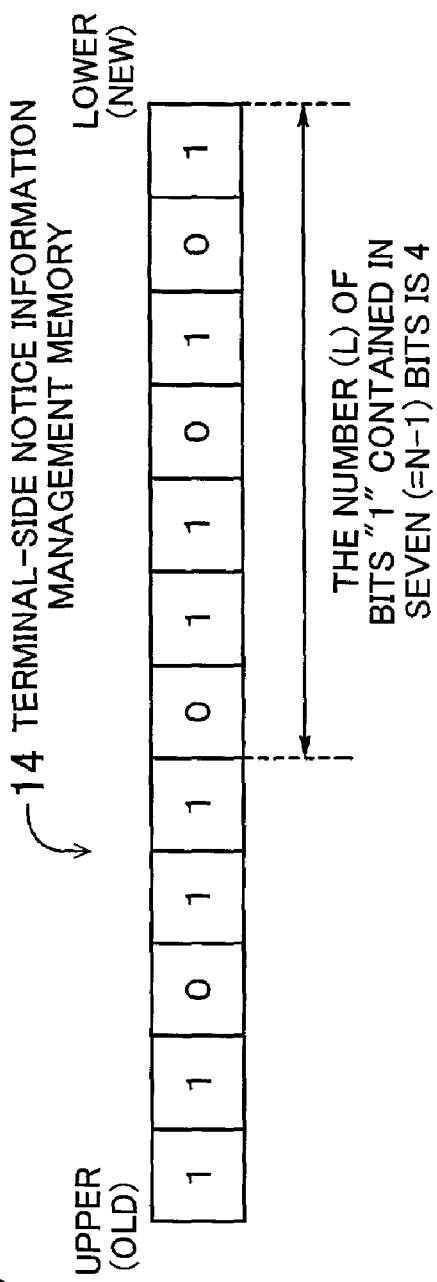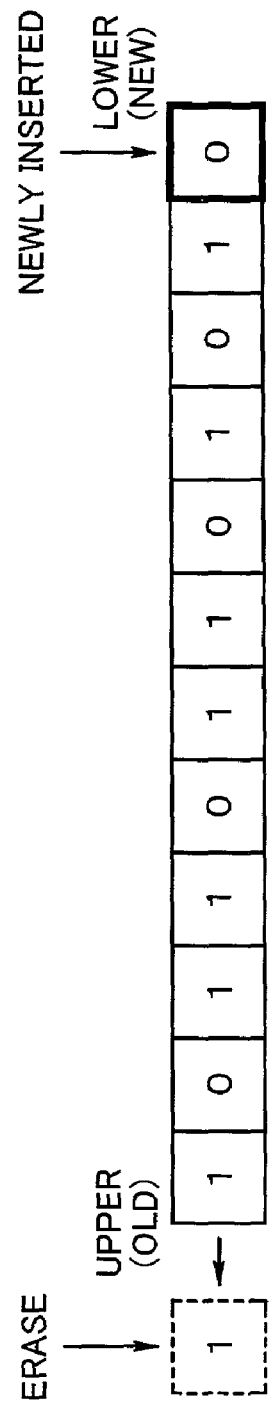
FIG. 9(A)
FIG. 9(B)

Tb CORRESPONDENCE TABLE

| IN-GROUP INFORMATION AMOUNT | GROUP STATUS VALUE |
|---|---|
| 0 | 0 |
| 1~10 | 1 |
| 11~100 | 2 |
| 101~500 | 3 |
| 501~1000 | 4 |
| 1001~2000 | 5 |
| 2001~4000 | 6 |
| 4001 OR MORE | 7 |

(HIERARCHICAL NUMBER N=8)

FIG. 15

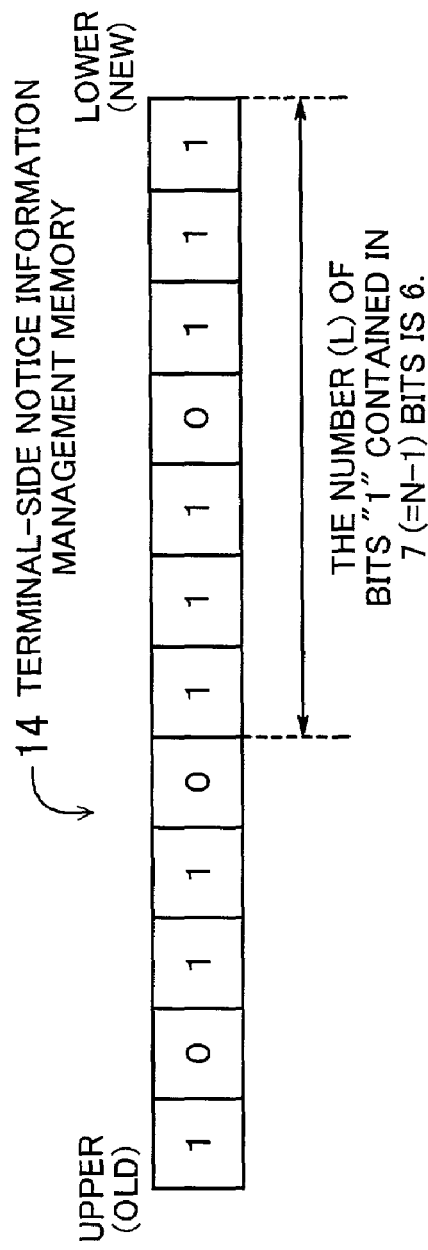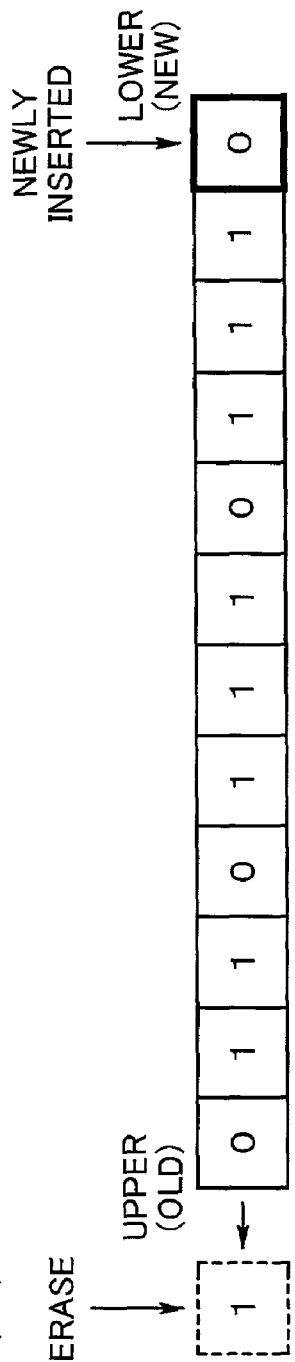
FIG. 16(A)
FIG. 16(B)

Tc CORRESPONDENCE TABLE

| BUFFER USAGE RATIO (X) [%] | BUFFER STATUS VALUE |
|---|---|
| 0 ≦ X < 1 | 0 |
| 1 ≦ X < 10 | 1 |
| 10 ≦ X < 25 | 2 |
| 25 ≦ X < 50 | 3 |
| 50 ≦ X < 70 | 4 |
| 70 ≦ X < 85 | 5 |
| 85 ≦ X < 95 | 6 |
| 95 ≦ X < 100 | 7 |

FIG. 19

COMMUNICATION SYSTEM PREFORMING CONTROL OF INFORMATION BETWEEN A TERMINAL DEVICE AND A NETWORK SIDE DEVICE INCLUDING BUFFER MANAGEMENT

BACKGROUND OF THE INVENTION

1. Field of the Invention

The present invention relates to communication systems, and more particularly, to a communication system that performs a communication control.

2. Description of the Related Art

Recently, an optical subscriber system having an optical subscriber communication network has been proposed. Particularly, there has been considerable activity in the construction of a PON (Passive Optical Network) system mainly employed in the Europe, and an ATM-PON, which utilizes an ATM (Asynchronous Transfer Mode) in order to guarantee a communication band and a requested quality for real-time communication of audio and video. Such an optical access system is an essential technique for providing a large capacity of communication services at a low cost, such as video-on-demand, CATV and high-speed computer communication, and attracts a lot of attention as a key network of the next generation.

FIG. 22 is a diagram of an ONU (Optical Network Unit) and an SLT (Subscriber Line Terminal) that construct an optical access system. Referring to FIG. 22, a plurality of ONUs 400-1 through 400-n are installed at subscribers' homes, and an SLT 500 is installed on an office side.

The ONUs 400-1 through 400-n and the single SLT 500 are connected by an optical transmission path via a branch part 300, and shares the optical transmission path by time-division control using polling. That is, each ONU is allowed to send information to the SLT after receiving a transmission acknowledgement from the SLT.

Each of the ONUs 400-1 through 400-n is equipped with a buffer B, which stores information to be sent to the office (up information). Further, each of the ONUs 400-1 through 400-n is required to notify the SLT 500 of the storage status showing how much up information is currently stored in the buffer B.

The SLT 500 receives the above notice, and recognizes the storage status of the buffer B of each of the ONUs 400-1 through 400-n. Then, the SLT 500 allocates the bands to the ONUs 400-1 through 400-n so that the ONUs can send up information to the SLT 500. The above buffer management control achieves transfer of information/data between the ONUs 400-1 through 400-n and the SLT 500.

A particular slot is exclusively used to send storage status information to the SLT 500 when the ONUs 400-1 through 400-n notify the SLT 500 of the storage status of their buffers B. However, the exclusive use of the particular slot degrades the efficiency of transfer of user information that is real information.

Japanese Unexamined Patent Publication No. 10-242981 proposes to use an idle field in the overhead added to each cell and make a notice of the storage status of one buffer at one time. However, presently, the ITU-T Recommendation G. 983 gives definitions to all the fields of the overhead. More particularly, the up transmission uses the overhead that consists of a guard field for avoiding collision of two cells, a bit synchronization field for establishing a bit-based synchronization, and a byte synchronization field for establishing a byte-based synchronization. If some existing fields are omitted, the originally needed functions will be lost and the communication quality will be degraded.

SUMMARY OF THE INVENTION

Taking the above into consideration, an object of the present invention is to provide a communication system capable of notifying a device of a storage status of a buffer so that the efficiency of transmission of user information can be prevented from being degraded and the communication quality can be improved.

To accomplish the above object, according to the present invention, there is provided a communication system performing communication control of information comprising a communication terminal device, and a communication control device, wherein the communication terminal device performs a terminal-side buffer management control and comprises: a correspondence table management unit creating, based on table forming information sent from an upper device, a correspondence table defining a correspondence between an in-buffer information amount indicating an amount of information stored in a buffer and a buffer status value indicating the in-buffer information amount in a hierarchical expression; a buffer status value acquiring unit referring to the correspondence table and acquiring a buffer status value of a buffer that issues a transmission event; a notice information setting unit comparing, with regard to an identical buffer, a size relation between status information about past buffer status values for the buffer and a current buffer status value acquired, and setting notice information on a bit basis determined by the size relation; a terminal-side notice information management memory storing and managing the notice information as the status information; and a notice information sending unit sending the notice information by using one slot or a plurality of slots to notify the upper device of the buffer status, and wherein the communication control device performs an office-side buffer management control and comprises: a table forming information sending unit creating the table forming information and sending the table forming information to the communication terminal device; a control-side notice information management memory receiving and managing the notice information sent by the communication terminal device; and a buffer status recognizing unit recognizing the buffer status of the communication terminal device from a content of the control-side notice information management memory.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 6(A) and 6(B) are diagrams showing a difference between the prior art and the present invention, wherein FIG. 6(A) shows the prior art and FIG. 6(B) shows the present invention;

FIG. 8 illustrates a correspondence table;

FIGS. 9(A) and 9(B) illustrate a terminal-side notice information management memory, wherein FIG. 9(A) shows a content of the memory before notice information is inserted and FIG. 9(B) shows a content thereof after notice information is inserted;

FIGS. 11(A) and 11(B) illustrate a control-side notice information management memory, in which FIG. 11(A) shows a content of the memory before notice information is inserted and FIG. 11(B) shows a content of the memory after notice information is inserted;

FIG. 15 illustrates a correspondence table;

FIGS. 16(A) and 16(B) illustrate a terminal-side notice information management memory, wherein FIG. 16(A) shows a content of the memory before notice information is inserted, and FIG. 16(B) shows a content of the memory after notice information is inserted;

FIGS. 17(A) and 17(B) illustrates a control-side notice information management memory, in which FIG. 17(A) shows a content of the memory before notice information is inserted, and FIG. 17(B) shows a content of the memory after notice information is inserted;

FIG. 19 illustrates a correspondence table;

FIGS. 21(A) and 21(B) illustrate a control-side notice information management memory, in which FIG. 21(A) shows a content of the memory before notice information is inserted, and FIG. 21(B) shows a content of the memory after notice information is inserted.

DESCRIPTION OF THE PREFERRED EMBODIMENTS

A description will be given of embodiments of the present invention with reference to the accompanying drawings.

Figure 1:
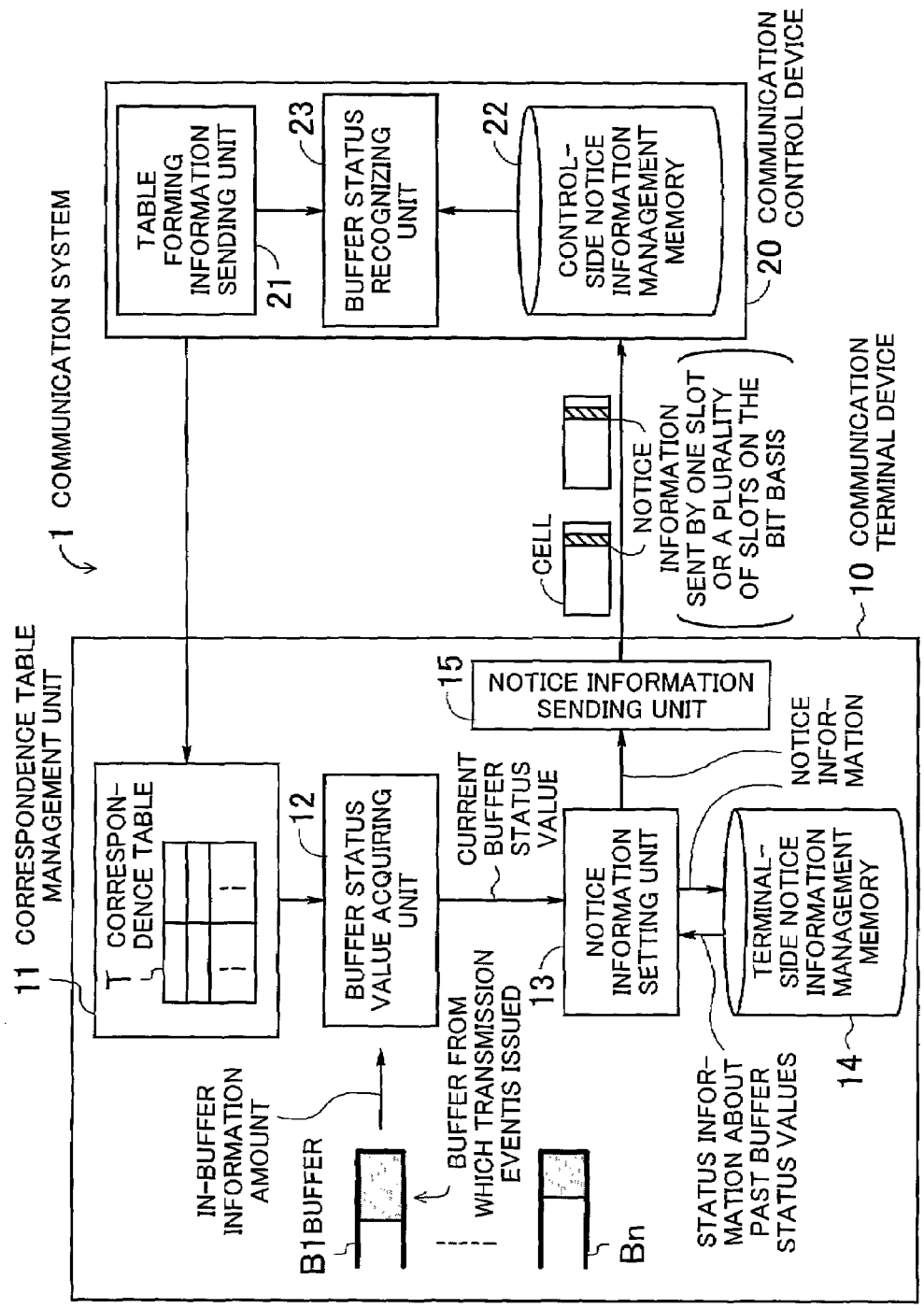
FIG. 1 is a diagram of a communication system according to an aspect of the present invention.

FIG. 1 is a block diagram of a communication system according to an aspect of the present invention. A communication system 1 includes a communication terminal device 10 installed on a subscriber side, and a communication control device 20 installed on an office side (network side).

The communication terminal device 10 is made up of a correspondence table management unit 11, a buffer status value acquiring unit 12, a notice information setting unit 13, a terminal-side notice information management memory 14, and a notice information sending unit 15. These structural units perform a terminal-side buffer management control.

The correspondence table management unit 11 creates and manages, based on table forming information sent from an upper device (which is the communication control device 20 in this embodiment), a correspondence table T. The correspondence table T defines a correspondence between an in-buffer information amount indicating the amount of information stored in buffers B1–Bn and a buffer status value, which indicates the in-buffer information amount in a hierarchical expression.

The buffer status value acquiring unit 12 refers to the correspondence table T, and acquires the buffer status value of the buffer B1 that issues a transmission event. With regard to the same buffer (buffer B1), the notice information setting unit 13 compares the size relation between the status information about the past buffer status values and the current buffer status value acquired. Then, the notice information setting unit 13 sets notice information on the bit basis, the notice information being determined on the comparison result. The notice information management memory 14 on the terminal side stores and manages the notice information as status information. The notice information sending unit 15 sends the notice information to the upper device by using one or a plurality of slots. Thus, the upper device can be notified of the buffer status.

The communication control device 20 is made up of a table forming information sending unit 21, a control-side notice information management memory 22, and a buffer status recognizing unit 23. These structural units perform an office-side buffer management control.

The table forming information sending unit 21 generates table forming information about the correspondence table T, and sends it to the communication terminal device 10. The control-side notice information management memory 22 receives notice information sent by the communication terminal device 10, and manages it. The buffer status recognizing unit 23 recognizes the buffer status of the communication terminal device 10 from the content of the notice information management memory 22 on the control side. The details of the operation of the buffer status recognizing unit 23 will be described later.

Figure 2:
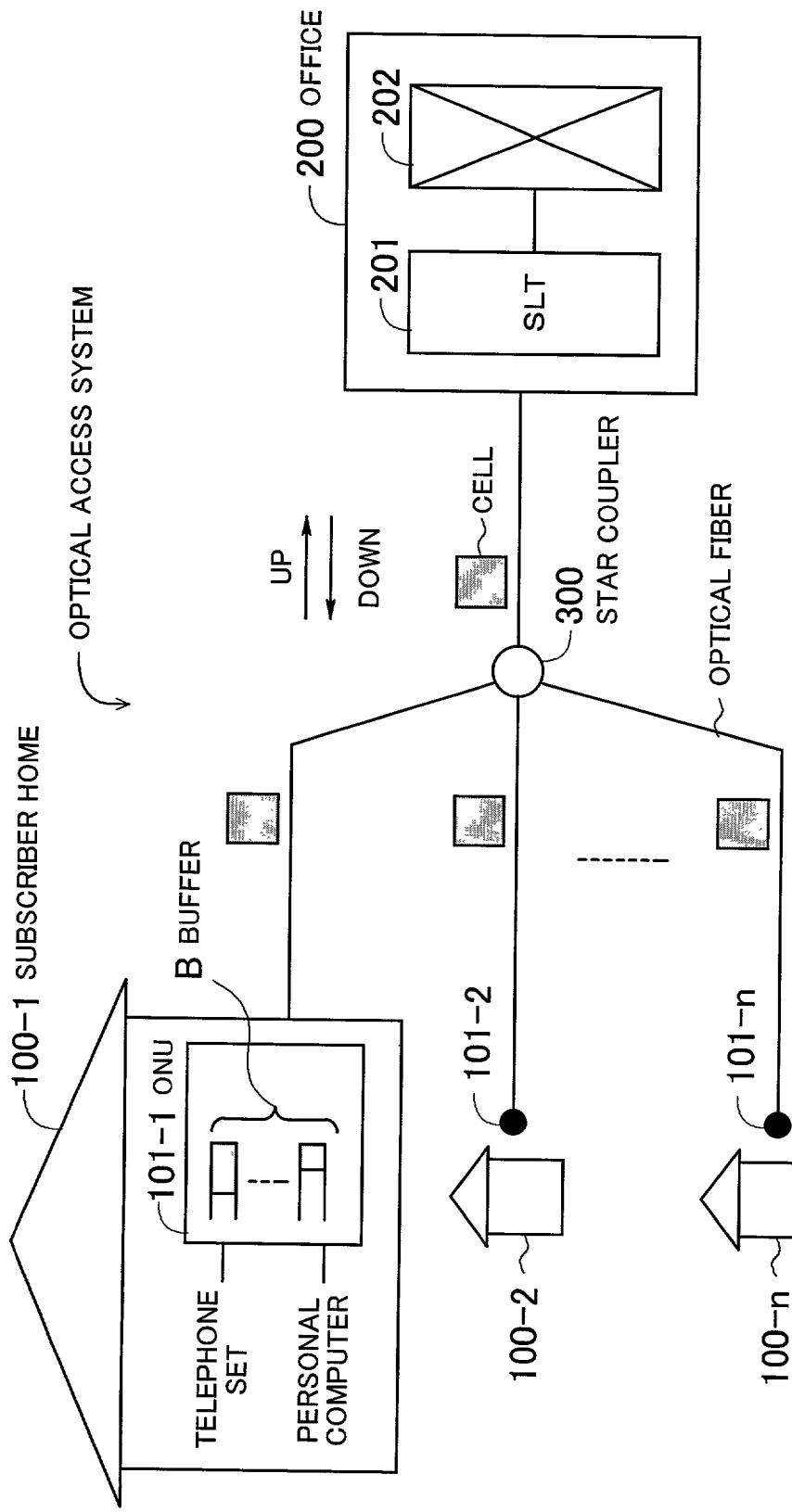
FIG. 2 is a diagram of an overview of an optical access system.

Next, a detailed description will be given of a case where the communication system 1 according to one aspect of the present invention is applied to an optical access system. FIG. 2 is a diagram of an overview of an optical access system. Referring to FIG. 2, ONUs 101-1 through 101-n are respectively installed at subscribers' homes 100-1 through 100-n, and implement an optical burst transfer. Hereinafter, the ONUs 101-1 through 101-n may be generically referred to as ONUs 101. An SLT 201 is disposed in an office 200. Each of the ONUs 101 corresponds to the aforementioned communication terminal device 10, and the SLT 201 corresponds to the aforementioned communication control device 20.

Telephone sets, personal computers or the like may be connected to the ONUs 101-1 through 101-n, and a switch 202 such as an ATM switch is connected to the SLT 201. The ONUs 101-1 through 101-n and the SLT 201 are connected to a star coupler 300.

Down information (downstream) from the office 200 to the subscribers' homes 100-1 through 100-n travels through a single optical fiber extending from the office 200, the star coupler 300, and optical fibers branching from the start coupler 300. Up information (upstream) from the subscribers' homes 100-1 through 100-n to the office 200 travels through the respective optical fibers, the star coupler 300 and the single optical fiber.

As described above, the optical access system is an optical branch type access network in which the office 200 and the subscribers' homes 100-1 through 100-n are connected via the star coupler 300 in 1:n formation.

Figure 22:
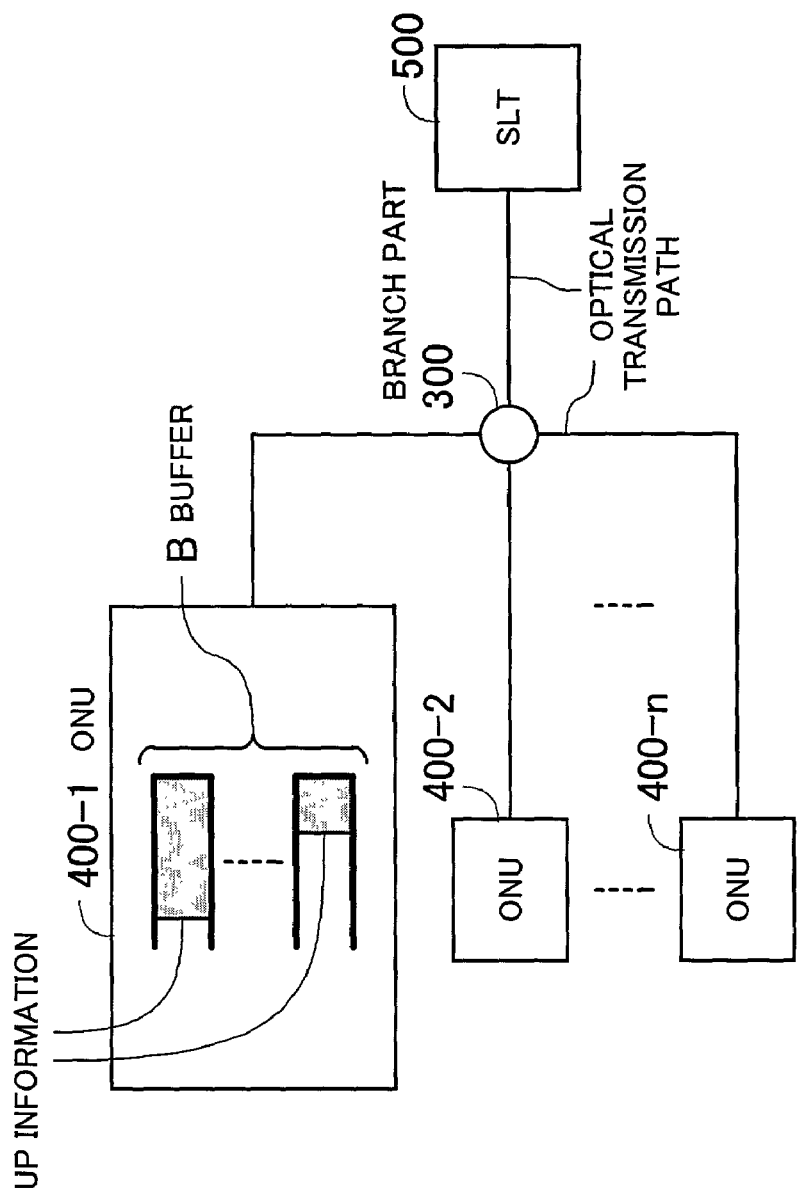
FIG. 22 is a block diagram of ONUs and an SLT that construct an optical access system.

Each of the ONUs 101-1 through 101-n is equipped with a buffer B, which stores up information to be sent to the office. An outline of the buffer management control of the optical access system is almost the same as that of the buffer management control that has been summarized with reference to FIG. 22.

Figure 3:
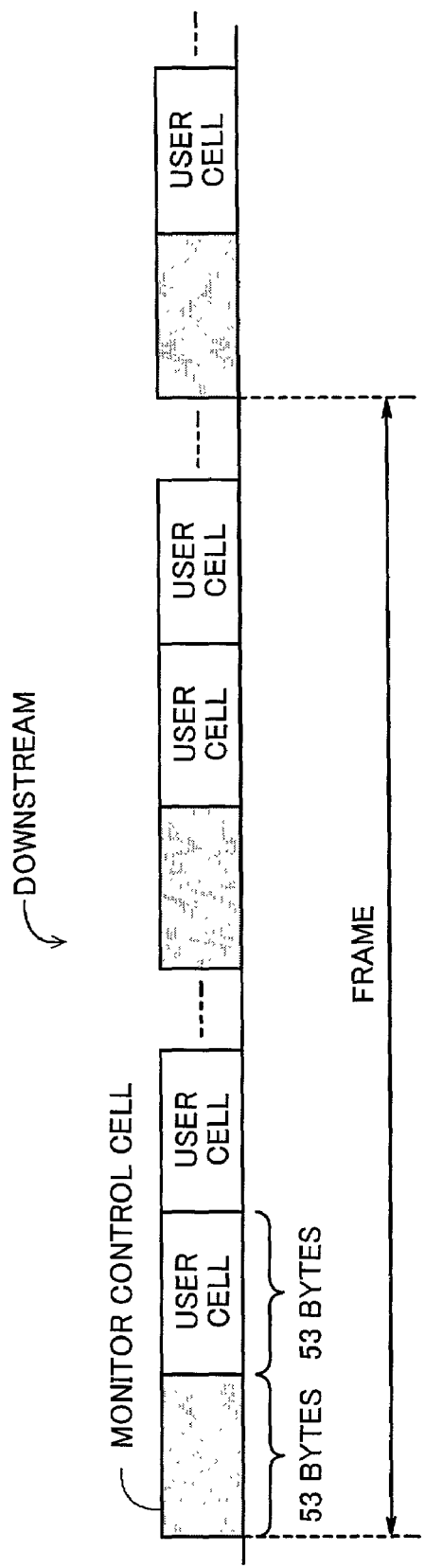
FIG. 3 illustrates a downstream.

The downstream and the upstream are described below. FIG. 3 illustrates a downstream. A downstream sent to the ONUs 101 from the SLT 201 includes monitor control cells and user cells (ATM cells), which are user information. The monitor control cells are located in two specific positions in one frame of the downstream. Each of the monitor control cells consists of a fixed number of bits equal to, for example, 53 bytes. Similarly, each of the user cells consist of, for example, 53 bytes.

Figure 4:
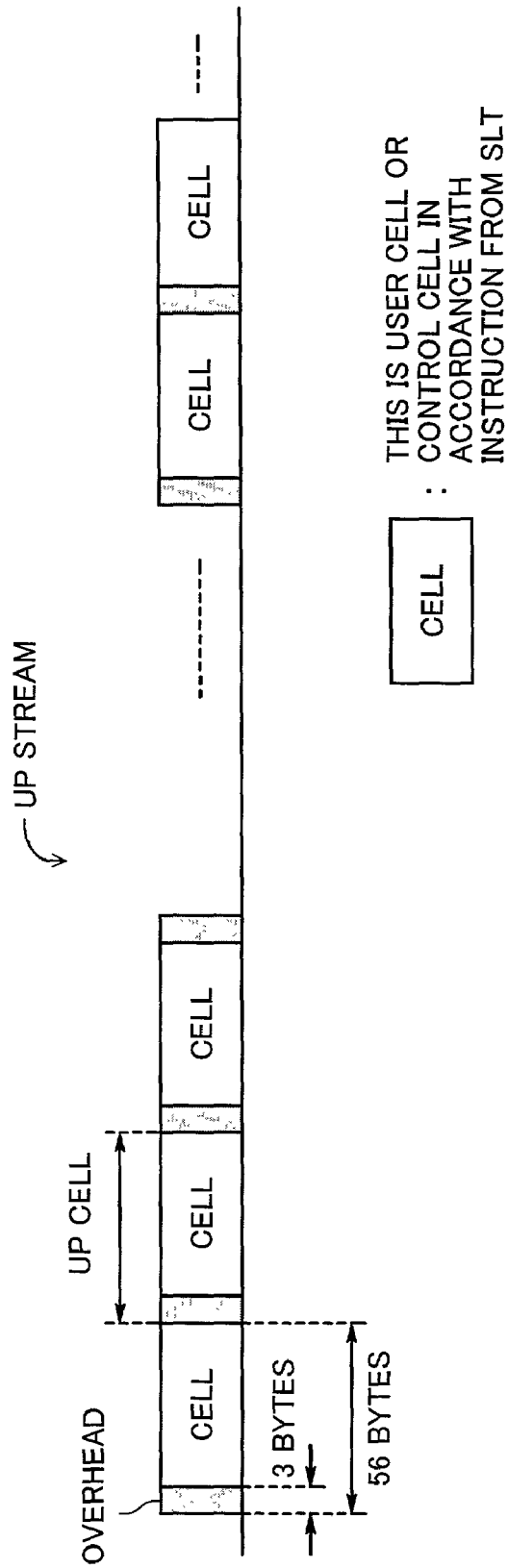
FIG. 4 illustrates an upstream.

FIG. 4 illustrates an upstream. An upstream from the ONUs 101 to the SLT 201 includes 56-byte cells, each of which cells is composed of an overhead of three bytes, and a cell of 53 bytes. Hereinafter, the 56-byte cell will be referred to as an up cell. The 53-byte cell contained in the 56-byte cell may be used as a monitor control cell or a user cell in accordance with an instruction from the SLT 201.

Next, polling is described. The SLT 201 determines the timing for reading information from each ONU on the basis of the communication status sent by each ONU. Information about the read timing is called polling information. The SLT 201 inserts the polling information into the monitor control cell of the downstream, and simultaneously sends it to all the ONUs 101-1 through 101-n. The ONUs 101 determine transmission timing for information to be transmitted on the basis of the received polling information.

In the above manner, the amount of polling may be dynamically changed on the basis of the communication status of each ONU. It is thus possible to efficiently accommodate traffic having a high burst-like property such as IP data traffic.

Figure 5:
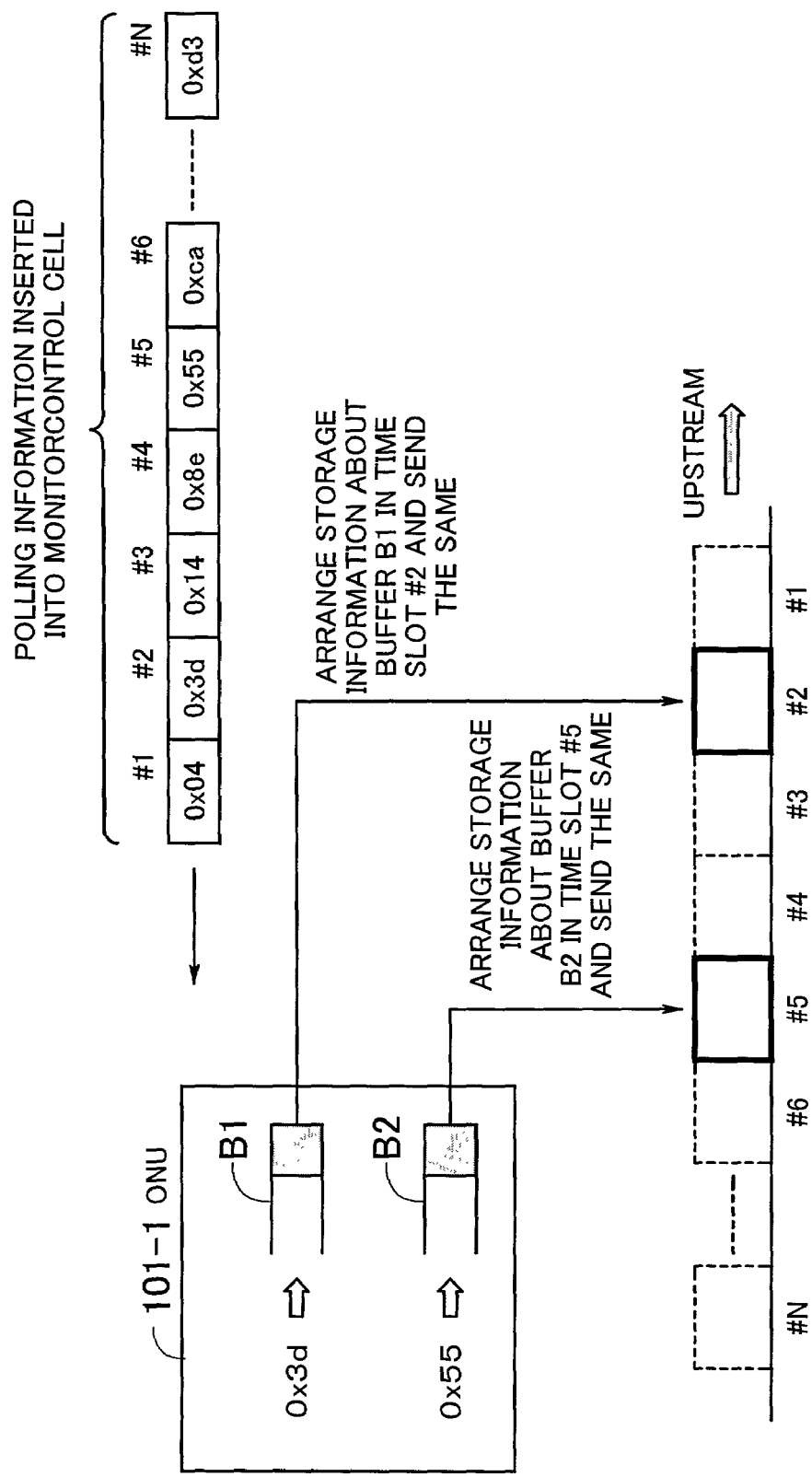
FIG. 5 is a diagram that explains a polling control.

FIG. 5 is a diagram that explains a polling control. Each of the ONUs 101 is assigned one or a plurality of identification numbers, which are associated with the buffers. For example, the ONU 101-1 may be assigned identification numbers of 0x3d and 0x55, which are respectively associated with buffers B1 and B2. The polling information includes identification numbers that correspond to time slot numbers #1–#N as shown in FIG. 5.

The ONU 101-1 drops the polling information from the downstream, and searches for its own identification numbers. When the ONU 101-1 finds its own identification number, the ONU 101-1 reads information from the associated buffer, and sends it to the SLT 201 so that it is placed in the defined time slot.

In the case illustrated in FIG. 5, up information from the buffer B1 is sent to the SLT 201 by using time slot #2 of the upstream, and up information from the buffer B2 is sent to the SLT 201 by using time slot #5.

A description will be given of differences between prior art and the present invention in terms of notice control of buffer storage status. As has been described with reference to FIG. 5, the ONUs 101 send information to the SLT 201 in time division multiplexing at the timings designated by the polling information from the SLT 201. When sending up information stored in the buffers to the SLT 201, the ONUs 101 notifies the SLT 201 of their own buffer storage statuses.

Figure 6A:
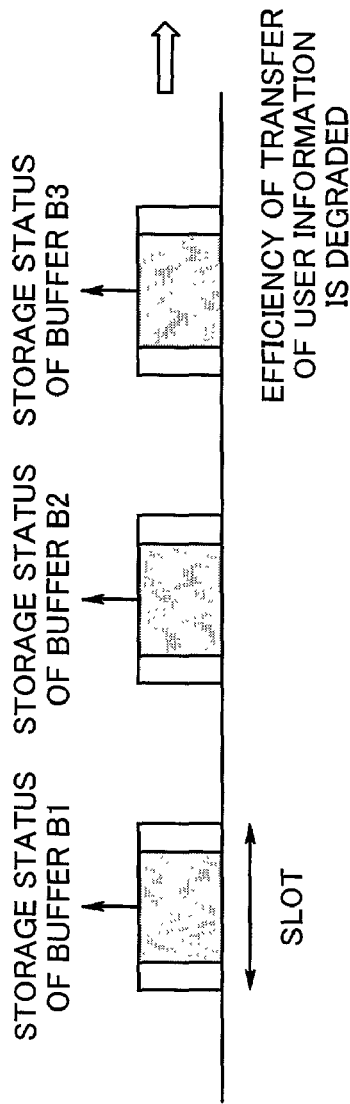
Figure 6B:
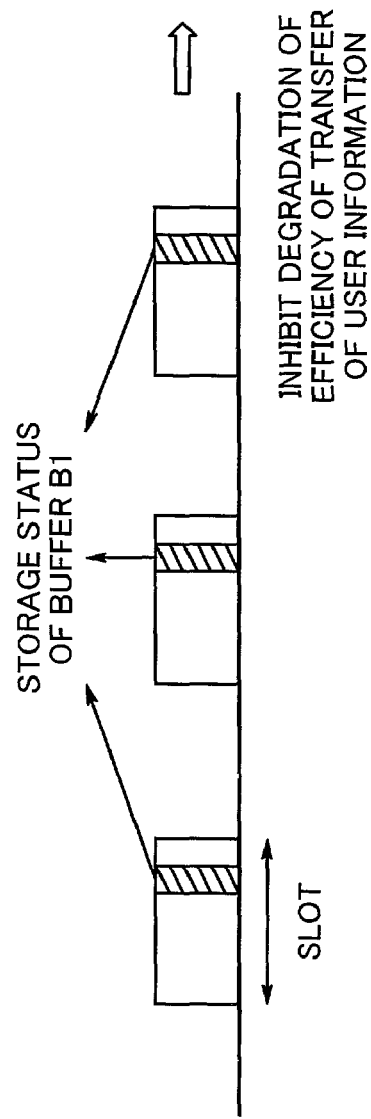

FIGS. 6(A) and 6(B) illustrate a difference between prior art and the present invention. The conventional notice control of the buffer storage status notifies the upper device of the buffer storage status by using the exclusively used slot or overhead, as has been described with reference to FIG. 22. Even in any way, the upper device is notified of the storage status of one buffer at one time.

FIG. 6(A) shows a conventional way to send the storage status of one buffer to the SLT 201 by using one time slot. As shown, three time slots are used for transmission of information about the storage statuses of the three buffers B1–B3.

Now, an exemplary case is considered where the SLT 201 accommodates 32 ONUs each having 32 buffers and one time slot is used for notice of the storage status of one buffer.

The SLT 201 receives the notices of the buffer storage statuses from the 1024 buffers. When two bytes are assigned for notice of the buffer storage status per buffer, 2048 bytes are needed to notify the upper device of the buffer storage statuses of all of the 1024 buffers.

When all ONUs notify the upper device of the storage statuses of their buffers at an interval of 1 ms, the band is occupied by information equal to about 16 Mbits (=2048×8×1000) per second. The currently available band in the up direction is approximately equal to 150 Mbps. Thus, the above buffer notice control will degrade the transfer efficiency by 10% or more.

Figure 7:
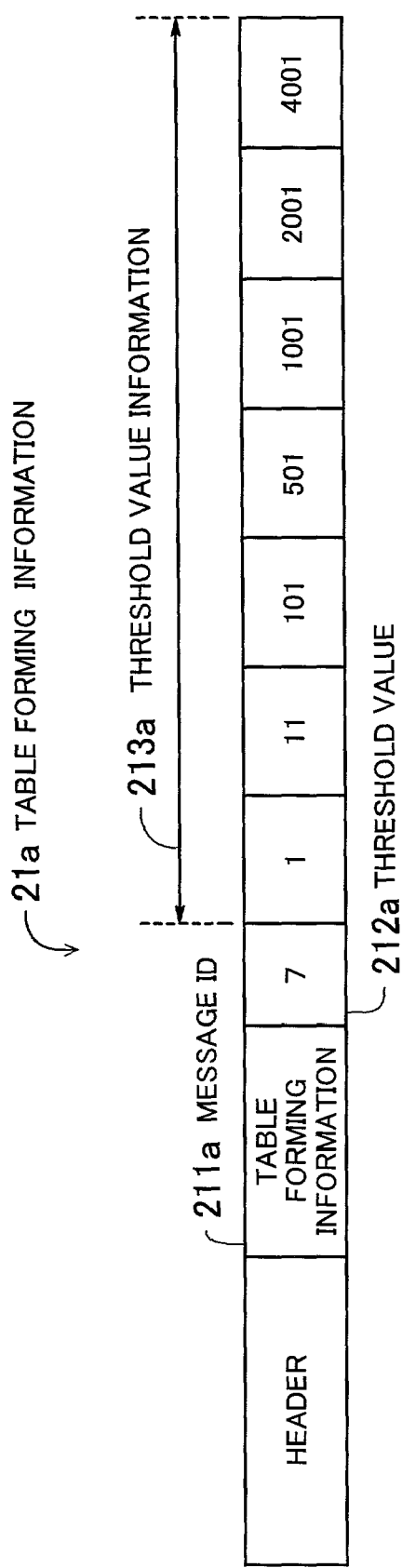
FIG. 7 illustrates a configuration of table forming information.

FIG. 6(B) shows a transfer of information about the buffer storage status according to the present invention, which will be described later with reference to FIG. 7 and some figures subsequent thereto. According to one aspect of the present invention, information about the storage status of one buffer is not sent to the upper device at one time, but is arranged over a plurality of slots. In practice, an only small number of bits that describe the storage status of one buffer is sent to the SLT over a plurality of slots, so that the buffer storage status can be mutually updated between the ONUs and SLT.

Thus, it becomes possible to send information about the buffer storage status to the upper device by using an idle part that is much smaller than each slot and to inhibit degradation of the efficiency of transfer of user information.

A description will be given of an operation of the present invention (positioned as a first embodiment thereof). FIG. 7 shows a configuration of the table forming information. Table forming information 21a is sent to the correspondence table management unit 11 of the communication terminal device 10 (which is hereinafter ONU 10) by the table forming information sending unit 21 in the communication control device (which is hereinafter SLT 20).

The table forming information 21a includes, as information necessary to create the correspondence table, message ID 211a, a threshold value 212a and threshold value information 213a.

The message ID 211a shows that the present message is table forming information. The threshold value 212a indicates the number of threshold values used for describing the in-buffer information amount in the hierarchical expression. The threshold value information 213a indicates the first values respectively obtained by dividing the in-buffer information amounts by the threshold values.

FIG. 8 illustrates an example of the correspondence table. The correspondence table management unit 11 receives the table forming information 21a, and creates and manages the correspondence table. A correspondence table Ta shown in FIG. 8 includes an item of an in-buffer information amount (its unit is the number of cells) indicating the amount of information stored in the buffer, and a buffer status value that describes the in-buffer information amount in the hierarchical expression. The example shown in FIG. 8 is created based on the table forming information 21a shown in FIG. 7, and a hierarchical number N used for describing the in-buffer information amount in hierarchical expression. In the present example, N is equal to 8.

Next, a process of setting the notice information will be described. In the following description, it is assumed that the in-buffer information amount of the buffer B1, which generates a transmission event among the buffers B provided in the ONU 10, is equal to 600. First, the buffer status value acquiring unit 12 refers to the correspondence table Ta, and acquires a buffer status value of 4 for the buffer B1 (when the buffer status value is denoted as K, then K=4).

FIGS. 9(A) and 9(B) illustrate an example of the notice information management memory 14 on the terminal side. More particularly, FIG. 9(A) shows a content of the terminal-side notice information management memory 14 before the notice information is inserted, and FIG. 9(B) shows a content thereof after the notice information is inserted. In the illustrated example, the number of boxes for storing notice information in the terminal-side notice information management memory 14 is equal to 12 (which is selected so as to be larger than the threshold value). It is further assumed that pieces of one-bit notice information "0" and "1" are stored in the boxes for the buffer B1.

The notice information setting unit 13 acquires the number of bits of "1" (=L) in the seven lower bits (=N−1) of the terminal-side notice information management memory 14. The seven lower bits are the status information about the past buffer status values. In the case shown in FIG. 9(A), L=4. That is, "status information about the past buffer status values" denotes a buffer status value that represents the number of bits "1" of the notice information counted up to the previous time.

The size relation between the current buffer status value (K=4) and the status information (L=4) about the past buffer status values is checked, and the notice information to be set at this time is determined. In the above case, K=L, and therefore "0" is set to the notice information. It will be noted that "1" is set to the notice information for K>L, and "0" is set for K≦L.

The notice information management memory 14 on the terminal side shifts the content of the memory to the left by one bit, and inserts notice information "0" in the least significant bit (FIG. 9(B)). Thereafter, the notice information sending unit 15 inserts the notice information "0" in the particular field of an up cell, and sends it to the SLT 20.

Figure 10:
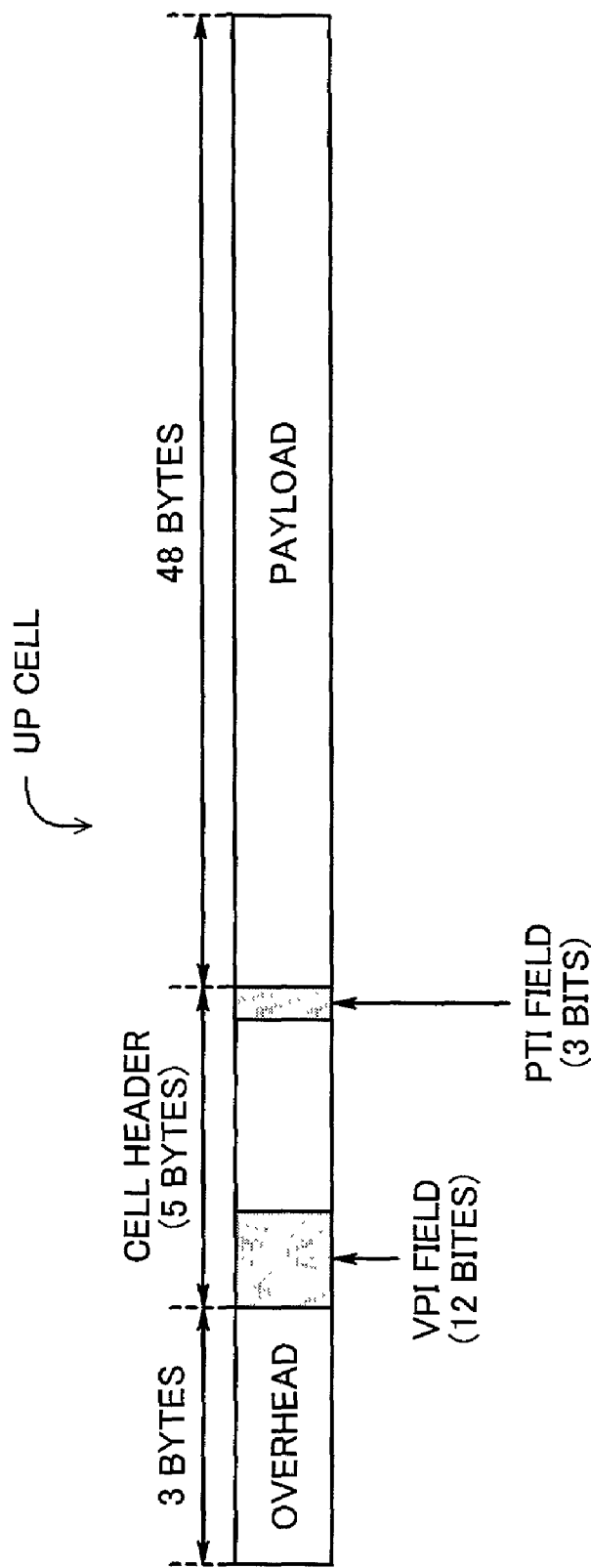
FIG. 10 illustrates a structure of an up cell including a field in which notice information may be inserted.

FIG. 10 illustrates a structure of the up cell including a field into which the notice information can be inserted. The up cell includes an overhead of 3 bytes, a cell header of 5 bytes, and a payload of 48 bytes. The cell header includes a VPI (Virtual Path Identifier) field of 12 bits, and a PTI (Payload Type Identifier) field of 3 bits.

The notice information sending unit 15 sends the notice information to the SLT 20 by utilizing a few upper bits in the VPI field and the second bit in the PTI field. In the above example, the notice information consists of only one bit, and may be inserted in, for example, the second bit in the PTI field.

A description will be given of an operation that is performed until the buffer status from the notice information is recognized. The SLT 20 acquires the notice information from the ONU 10.

Figure 11A:
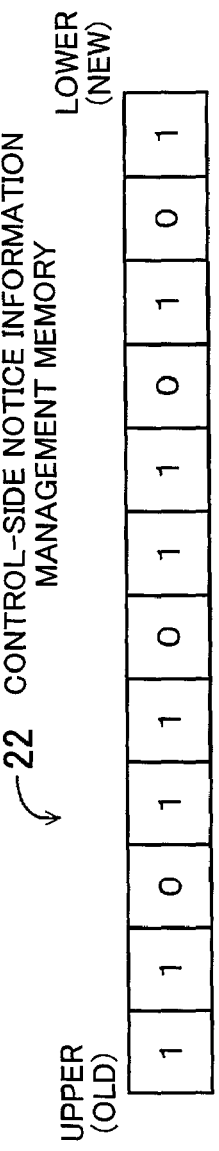
Figure 11B:
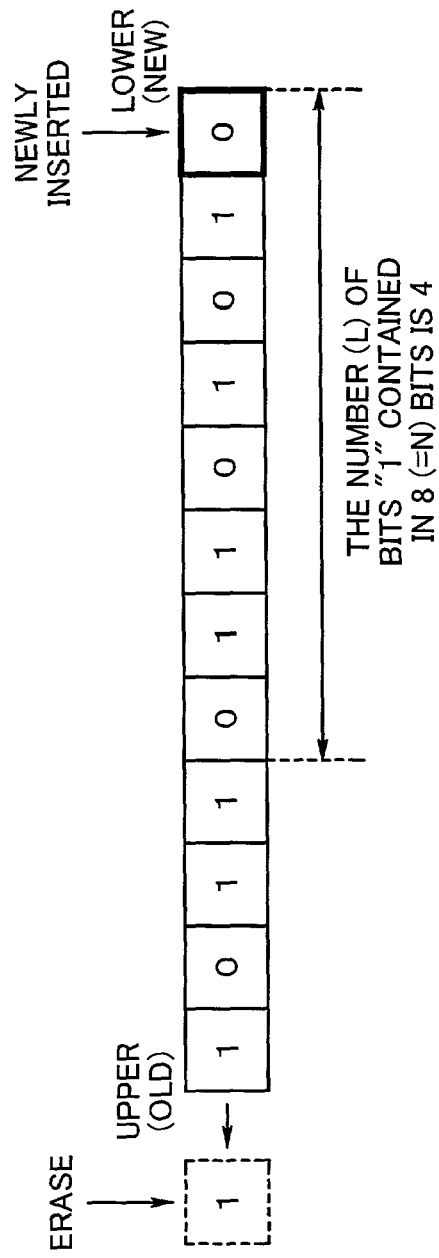

FIGS. 11(A) and 11(B) show an example of the notice information management memory 22 on the control side. More particularly, FIG. 11(A) shows a content of the control-side notice information management memory 22 before the notice information is inserted and FIG. 11(B) shows a content thereof after the notice information is inserted. The control-side notice information management memory 22 has the same number of boxes as that of the notice information management memory 14 on the terminal side. The notice information management memory 22 on the control side is updated upon receiving the notice information, so that the control-side notice information management memory 22 has the same values as those of the notice information management memory 14 on the terminal side.

The notice information management memory 22 on the control side receives one-bit notice information and shifts the content for the buffer B1 to the left by one bit. Then, the control-side notice information management memory 22 inserts notice information "0" into the least significant bit. After one-bit insertion, four bits of "1" are contained in the N lower bits of the notice information management memory 22 on the control side (FIG. 11(B)).

Thus, the buffer status recognizing unit 23 recognizes, from the content of the control-side notice information management memory 22, that the buffer status of the buffer B1 is 4 (which means that an in-buffer information amount of 501–1000 is available).

The above-mentioned control enables the SLT 20 to correctly recognize the buffer status. Thereafter, the SLT 20 assigns the band necessary for transfer of up information to the ONU 10.

The previously given description shows the following exemplary case. The current buffer status value (K) and the status information (L) about the past buffer status values have a size relation such that K=L. The notice information from the ONU 10 to the SLT 20 is sent at one time (by only one slot). Thus, the notice information management memory 14 on the terminal side and the notice information management memory 22 on the control side have an identical content such that the buffer status value for the buffer B1 is 4.

Now, another case will be considered where traffic rapidly increases from a status pointed out by a buffer status value of 0 to a status pointed out by a buffer status value of 7. In this case, if the seven lower bits of the notice information management memory 14 on the terminal side are all 0 (and therefore the seven lower bits of the notice information management memory 22 on the control side are also all 0), the ONU 10 will not be able to notify the SLT 20 of the current buffer status of the buffer B1 unless the ONU 10 sends the SLT 20 notice information "1" by using seven slots (because K>L).

Even if the buffer status value rapidly changes to the maximum value, the time equal to only seven slots at maximum is needed for transmission of notice information. Hence, the SLT 20 can be notified of the buffer status only for a short time. Further, it is possible to prevent the efficiency of transmission of user information from being degraded because notice information consisting of only one bit is inserted into the notice field of each up cell in the respective slot.

Figure 12:
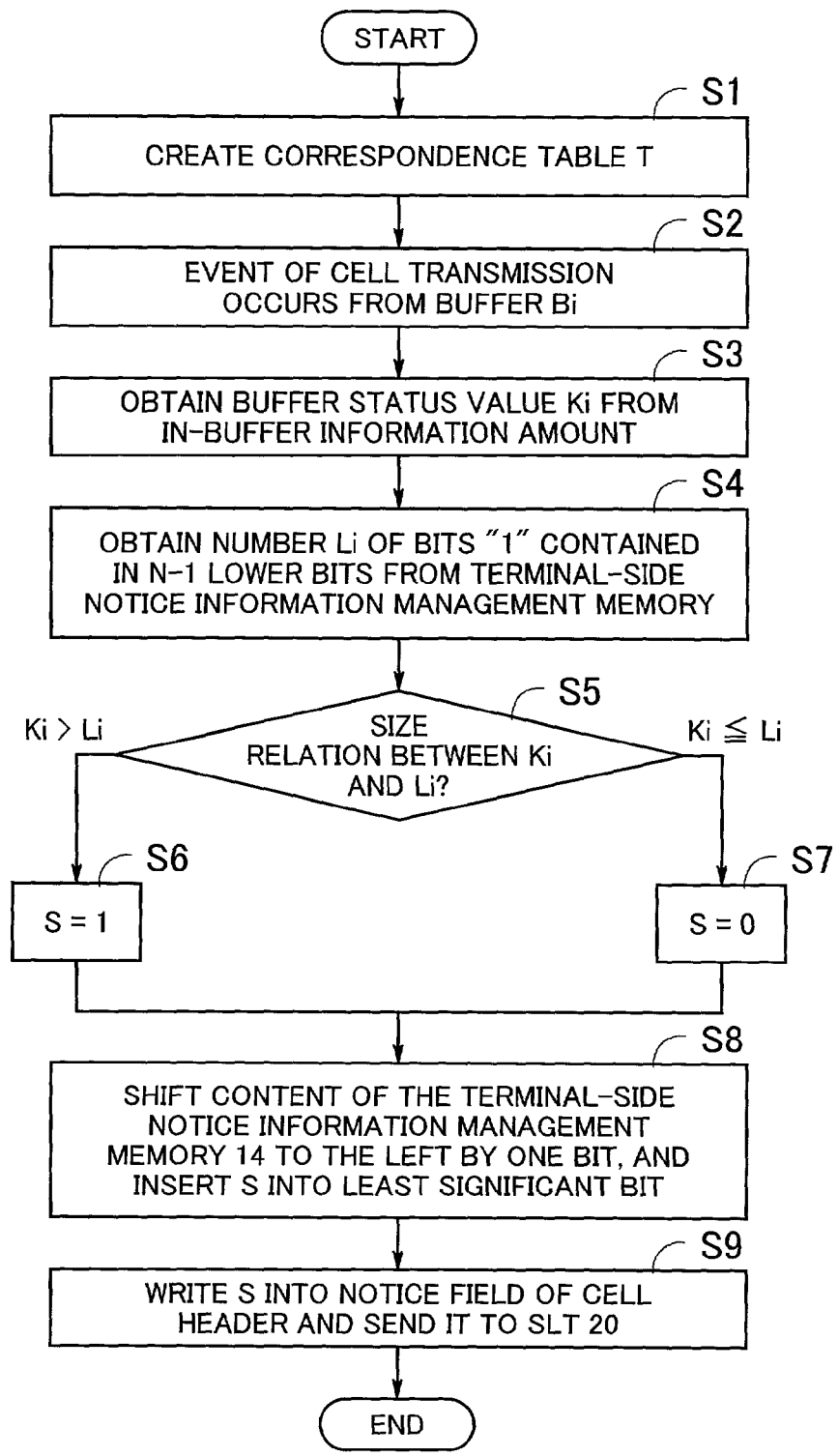
FIG. 12 is a flowchart of an operation of an ONU.

A description will now be given of the operations of the ONU 10 and the SLT 20 with reference to flowcharts. FIG. 12 is a flowchart of the operation of the ONU 10.

[S1] The correspondence table management unit 11 receives the table forming information sent by the SLT 20, and creates the correspondence table T.

[S2] An upper cell transmission event is issued from buffer Bi in the ONU 10.

[S3] The buffer status value acquiring unit 12 refers to the correspondence table T, and acquires buffer status value Ki corresponding to the in-buffer information amount for the buffer Bi.

[S4]
The notice information setting unit 13 obtains, as status information about the past buffer status values, the number Li of 1 in the N-1 lower bits from the notice information management memory 14 on the terminal side where N denotes a hierarchical number for hierarchical expression.

[S5] The notice information setting unit 13 checks the size relation between Ki and Li. For Ki>Li, the process proceeds with step S6. For Ki≦Li, the process proceeds with step S7.

[S6] The notice information setting unit 13 sets 1 to the notice information S.

[S7] The notice information setting unit 13 sets 0 to the notice information S.

[S8] The notice information management memory 14 on the terminal side shifts the content thereof to the left by one bit, and inserts notice information S in the least significant bit.

[S9] The notice information sending unit 15 writes notice information S in the notice field of the up cell (which may be the VPI field or the PTI field), and sends it to the SLT 20.

Figure 13:
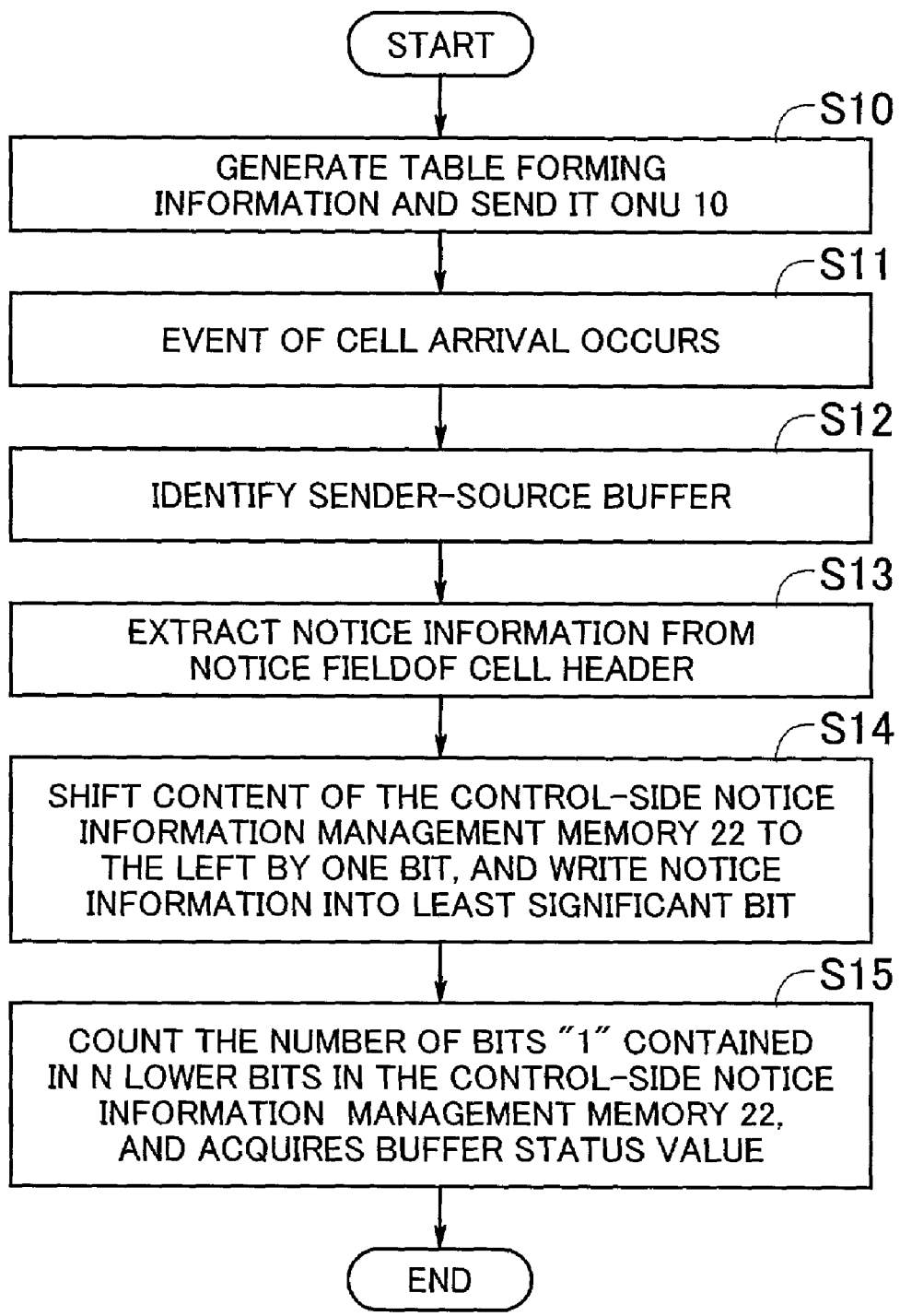
FIG. 13 is a flowchart of an operation of a SLT.

FIG. 13 is a flowchart of the operation of the SLT 20.

The table forming information sending unit 21 creates table forming information about the correspondence table T, and sends it to the ONU 10.

The SLT 20 recognizes the occurrence of an arrival event of an upper cell.

The SLT 20 identifies the sender-source buffer.

The SLT 20 extracts the notice information S from the notice field (the VPI field or the PTI field) of the cell header of the upper cell.

The notice information management memory 22 on the control side shifts the content thereof to the left by one bit, and inserts the notice information S in the least significant bit.

The buffer status recognizing unit 23 counts the number of 1 in the N lower bits, and recognizes the buffer status of the buffer Bi provided in the ONU 10.

Next, a description will be given of a second embodiment of the present invention. The second embodiment divides a plurality of buffers provided in the ONU 10 into groups, and performs the buffer management and control on the terminal and office sides on the group basis.

For example, assuming that the ONU 10 has 12 buffers B1–B12, these buffers are divided into groups G1–G3, and the buffer management and control is performed for each of the groups G1–G3. The group G1 consists of buffers B1–B4. The group G2 consists of buffers B5–B8. The group G3 consists of buffers B9–B12.

Figure 14:
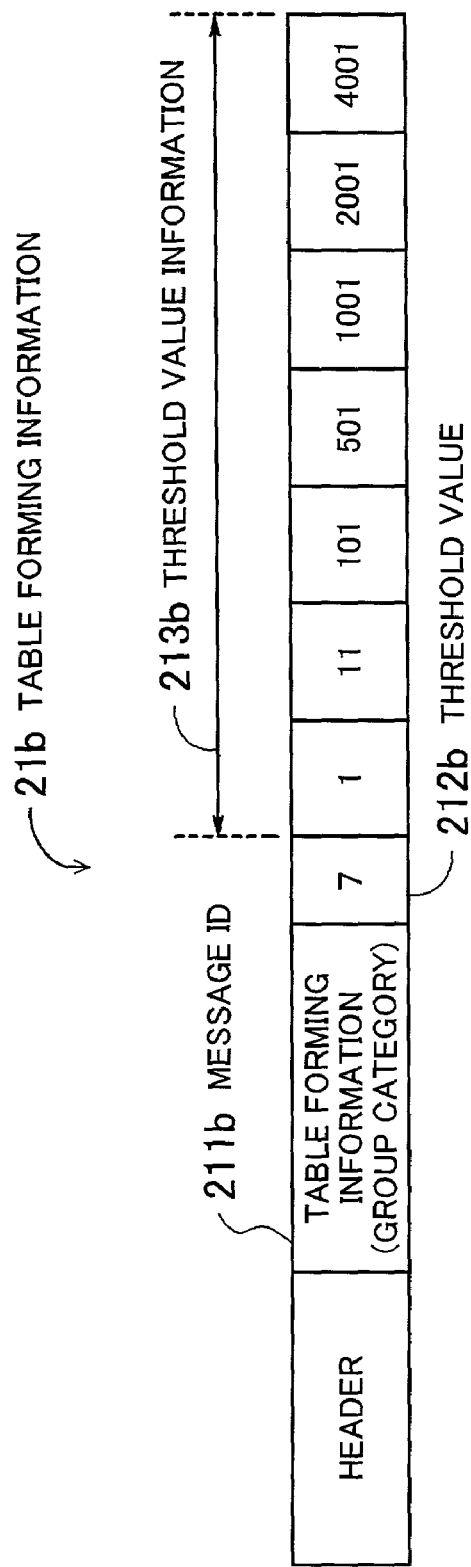
FIG. 14 illustrates a configuration of table forming information.

FIG. 14 is a diagram of a configuration of table forming information. Table forming information 21b shown in FIG. 14 includes a message ID 211b, a threshold value 212b, and threshold value information 213b as information necessary for creating the correspondence table.

The message ID 211b shows the present message is table forming information (group category). The threshold value 212b indicates the number of threshold values used for the in-group information amount in the hierarchical expression. The threshold value information 213b indicates the first values respectively obtained by dividing the in-group information amounts by the threshold values.

FIG. 15 illustrates an example of the correspondence table. A correspondence table Tb shown in FIG. 15 includes an item of an in-group information amount indicating the amount of information stored in the group (its unit is the number of cells), and an item of a group status value that describes the in-group information amount in a hierarchical expression. The example shown in FIG. 15 is creased based on the table forming information 21b shown in FIG. 14, and the hierarchical number N thereof is 8.

Next, a process of setting the notice information will be described. In the following description, it is assumed that a transmission event is issued from the group G1 (which consists of the buffers B1–B4) among the groups G1–G3 in the ONU 10.

It is also assumed that the in-buffer information amounts of the buffers B1, B2, B3 and B4 in the group G1 are respectively 1200, 600, 100 and 800. Thus, the in-group information amount is 2700.

First, the buffer status value acquiring unit 12 refers to the correspondence table Tb, and acquires a group status value of 6 for the group B1 (when the group status value is denoted as K, then K=6).

FIGS. 16(A) and 16(B) illustrates an example of the notice information management memory 14 on the terminal side. More particularly, FIG. 16(A) shows a content of the terminal-side notice information management memory 14 before the notice information is inserted, and FIG. 16(B) shows a content thereof after the notice information is inserted. In the illustrated example, the number of boxes for storing notice information in the terminal-side notice information management memory 14 is equal to 12. It is assumed that pieces of one-bit notice information "0" and "1" are stored in the boxes for the group G1.

The notice information setting unit 13 acquires the number of bits "1" (=L) in the seven lower bits (=N−1) of the terminal-side notice information management memory 14. In the case shown in FIG. 16(A), L=6.

Then, the size relation between the current buffer status value (K=6) and the status information about the past buffer status values (L=6) is checked, and the notice information to be used at this time is determined. In this case, since K=L, "0" is set to the notice information.

The notice information management memory 14 on the terminal side shifts the content of the memory to the left by one bit, and inserts notice information "0" in the least significant bit (FIG. 16(B)). After that, the notice information sending unit 15 inserts the notice information "0" in the particular field of an up cell (which field may be the VPI field or the PTI field that have been described with reference to FIG. 10), and sends it to the SLT 20.

A description will be given of an operation that is performed until the buffer status from the notice information is recognized. The SLT 20 acquires the notice information from the ONU 10.

Figure 17A:
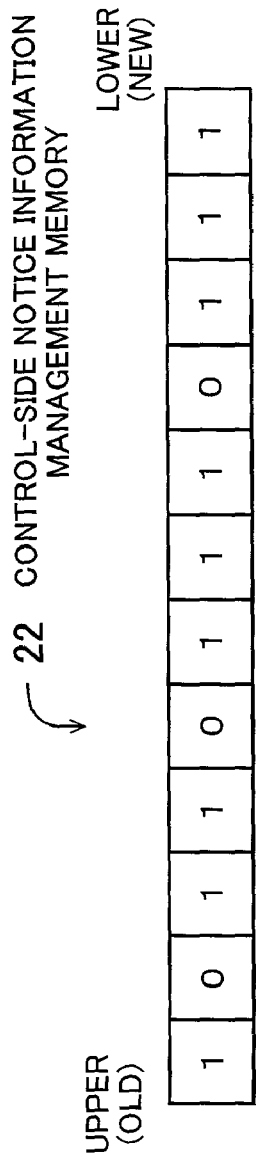
Figure 17B:
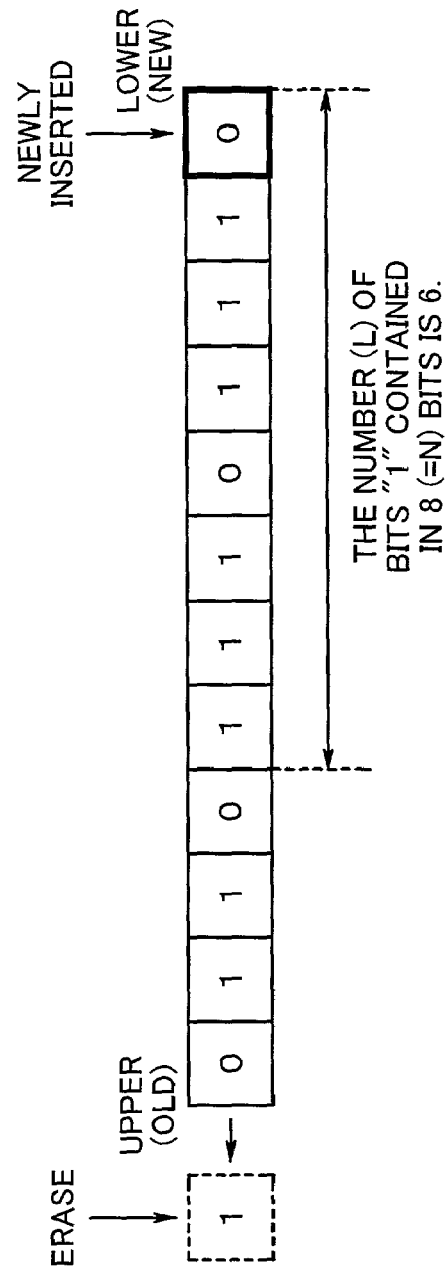

FIGS. 17(A) and 17(B) show an example of the notice information management memory 22 on the control side. More particularly, FIG. 17(A) shows a content of the control-side notice information management memory 22 before the notice information is inserted, and FIG. 17(B) shows a content thereof after the notice information is inserted. The control-side notice information management memory 22 has the same number of boxes as that of the notice information management memory 14 on the terminal side. The control-side notice information management memory 22 is updated upon receiving the notice information, so that the control-side notice information management memory 22 has the same values as those of the notice information management memory 14 on the terminal side.

The notice information management memory 22 on the control side receives one-bit notice information, and shifts the content for the group G1 to the left by one bit. Then, the control-side notice information management memory 22 inserts notice information "0" into the least significant bit (FIG. 17(B)). After one-bit insertion, six bits of "1" are contained in the N lower bits of the notice information management memory 22 on the control side.

Thus, the buffer status recognizing unit 23 recognizes, from the content of the control-side notice information management memory 22, that the buffer status of the group G1 is 6 (which means that an in-group information amount of 2001–4000 is available).

As described above, the second embodiment of the present invention performs the buffer storage control on the group basis. It is therefore possible for the SLT 20 to set polling information on the group basis and to improve the flexibility of communication.

A description will be given of a third embodiment of the present invention. The third embodiment performs the buffer management and control on the terminal and office sides on the basis of a buffer usage ratio on the side of ONU 10.

For example, the buffer usage ratio is defined so that, when 10 cells are stored in a single buffer capable of storing information equal to 100 cells, the buffer usage ratio is 10%. The buffer usage ratio is computed by the buffer status value acquiring unit 12.

Figure 18:
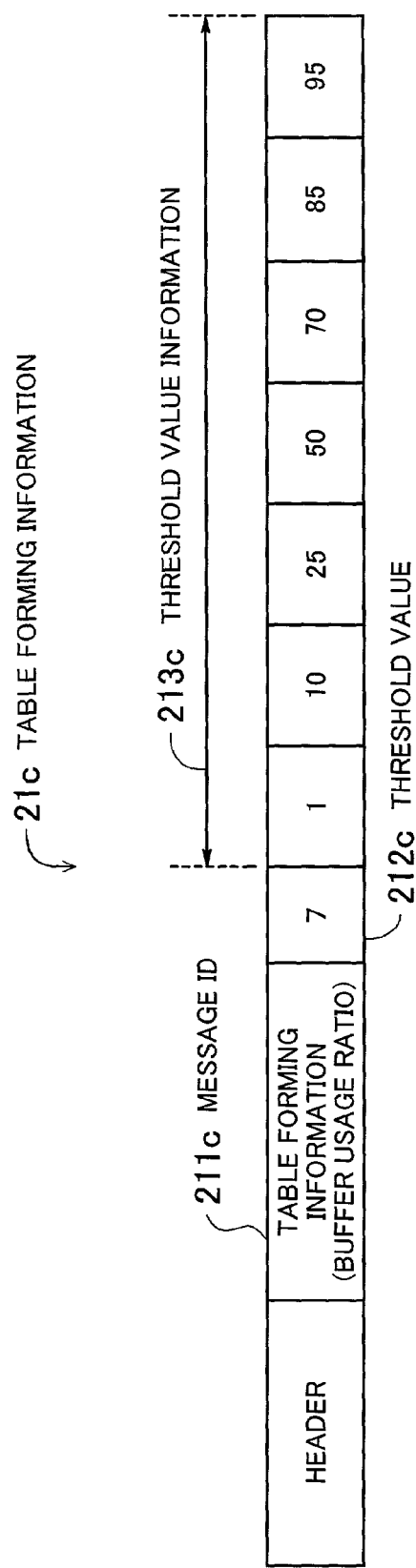
FIG. 18 illustrates a configuration of table forming information.

FIG. 18 shows a configuration of the table forming information. Table forming information 21c shown in FIG. 18 includes, as information necessary for creating the correspondence table, a message ID 211c, a threshold vale 212c, and threshold value information 213c.

The message ID 211c shows that the present message is the table forming information (buffer usage ratio). The threshold value 212c indicates the number of threshold values for describing the buffer usage ratio in a hierarchical expression. The threshold value information 213c indicates the first values respectively obtained by dividing the buffer usage ratios by the threshold values.

FIG. 19 illustrates an example of the correspondence table. A correspondence table Tc shown in FIG. 19 includes an item of a buffer usage ratio (its unit is %) for the buffer, and an item of a buffer status value that describes the buffer usage ratio in a hierarchical expression. The example shown in FIG. 19 is created based on the table forming information 21c shown in FIG. 18. The basic operation for the setting of notice information is the same as that of the first and second embodiments, and thus a description thereof is omitted.

As described above, the third embodiment of the present invention performs the buffer storage control on the basis of the buffer usage ratio. Discarding of cells from a buffer may be started when the buffer usage ratio becomes 100%. In the third embodiment, the SLT 20 is capable of checking a possibility that cells may be discarded because the SLT 20 is notified of the buffer usage ratio. Thus, polling information may be preferentially supplied to a buffer having a buffer usage ratio close to 100%, so that the possibility of cell discarding can be reduced.

Further, the second and third embodiments may be combined so that the buffer storage control can be performed on the basis of the buffer usage ratio in each group (group usage ratio). In this case, the SLT 20 can recognize the group usage ratio. Thus, polling information may be preferentially supplied to a buffer having a buffer usage ratio close to 100%, so that the possibility of cell discarding can be reduced.

A description will be given of a case where notice information is sent by two bits or more in a single slot. In the first embodiment of the present invention, notice information is sent by one slot or a plurality of slots in which notice information "0" or "1" is inserted. In contrast, in the following case, notice information consisting of three bits is sent by using a single slot. In the following, it is assumed that the buffer B1 among the buffers of the ONU 10 issues a transmission event, and its buffer status value K is equal to 5 (the hierarchical number N is equal to 8).

Figure 20:
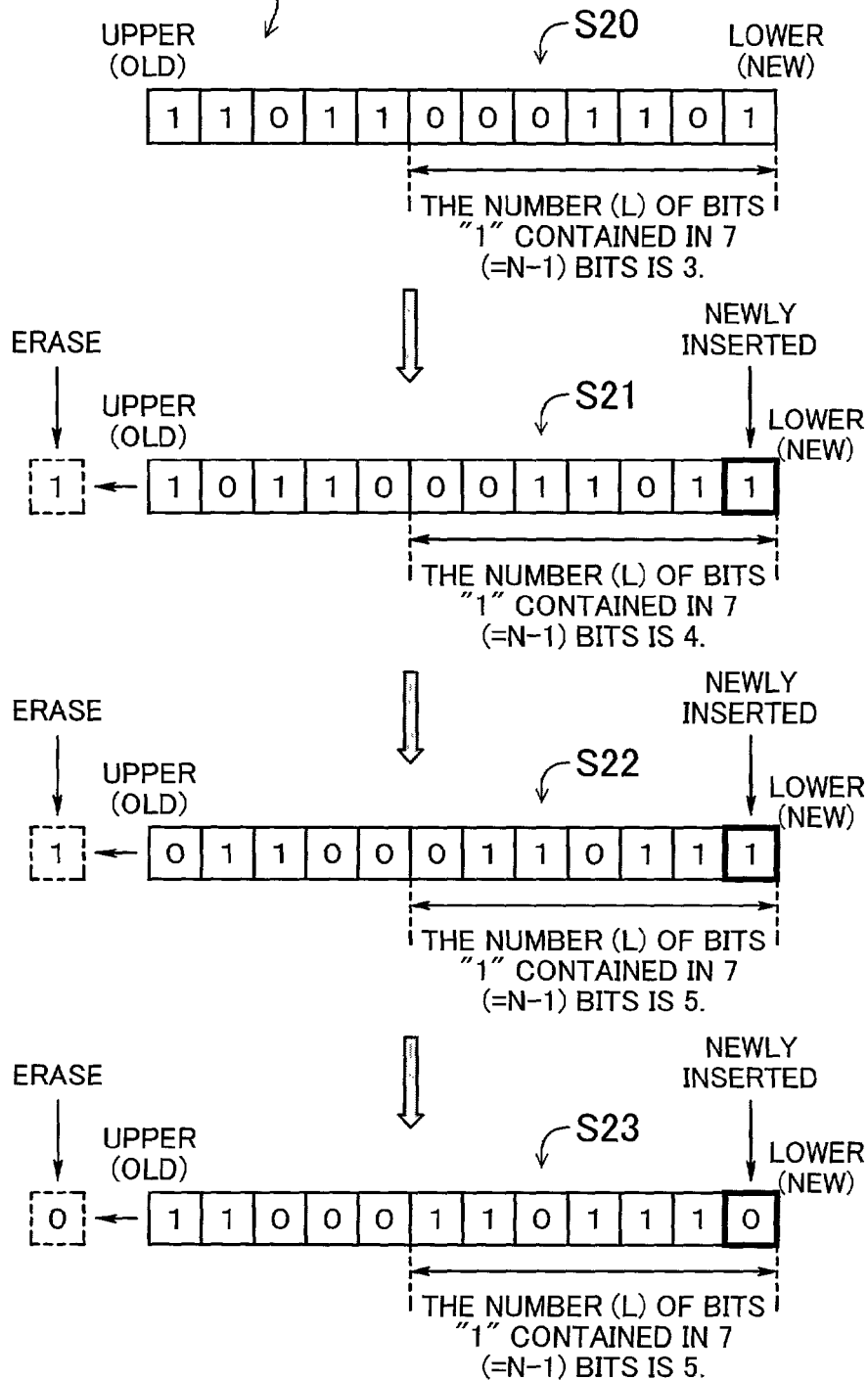
FIG. 20 illustrates a terminal-side notice information management memory.

FIG. 20 shows contents of the notice information management memory 14 on the terminal side. Step S20 shows a content of the terminal-side notice information management memory 14 before notice information is inserted. The terminal-side notice information management memory 14 in the present example has 12 boxes for storing pieces of notice information. It is assumed that items of one-bit notice information "0" and "1" are stored in the boxes for the buffer B1.

The notice information setting unit 13 acquires the number of bits "1" (=L) in the seven lower bits (=N−1) of the notice information management memory 14 on the terminal side. In the case shown in FIG. 20, L=3.

Then, the size relation between the current buffer status value (K=5) and the status information about the past buffer status values (L=3) is checked, and the notice information to be used at this time is determined. In the above case, K>L, and therefore "1" is set to the notice information. Then, as shown by step S21, the notice information management memory 14 on the terminal side shifts the content thereof to the left by one bit, and inserts notice information "1" in the least significant bit.

Further, the size relation between the current buffer status vale (K=5) and the status information about the past buffer status values (L=4), and the notice information to be used at this time is determined. In this case, K>L, and "1" is set to the notice information. Then, as shown by step S22, the terminal-side notice information management memory 14 shifts the content thereof to the left by one bit, and inserts notice information "1" in the least significant bit.

Furthermore, the size relation between the current buffer status vale (K=5) and the status information about the past buffer status values (L=5) is checked, and the notice information at this time is determined. In this case, K=L, so that "0" is set to the notice information. Then, as shown by step S23, the terminal-side notice information management memory 14 shifts the content thereof to the left by one bit, and inserts notice information "0" in the least significant bit.

Then, the notice information sending unit 15 inserts three bits "1", "1" and "0" of the notice information into the particular field of the up cell (VPI field shown in FIG. 10), and sends it to the SLT 20.

Next, a description will be given of an operation that is performed until the buffer status from the notice information is recognized. The SLT 10 acquires the three-bit notice information sent by the ONU 10.

Figure 21A:
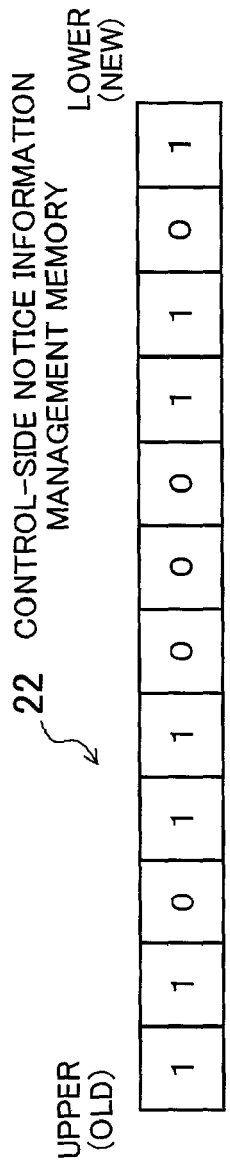
Figure 21B:
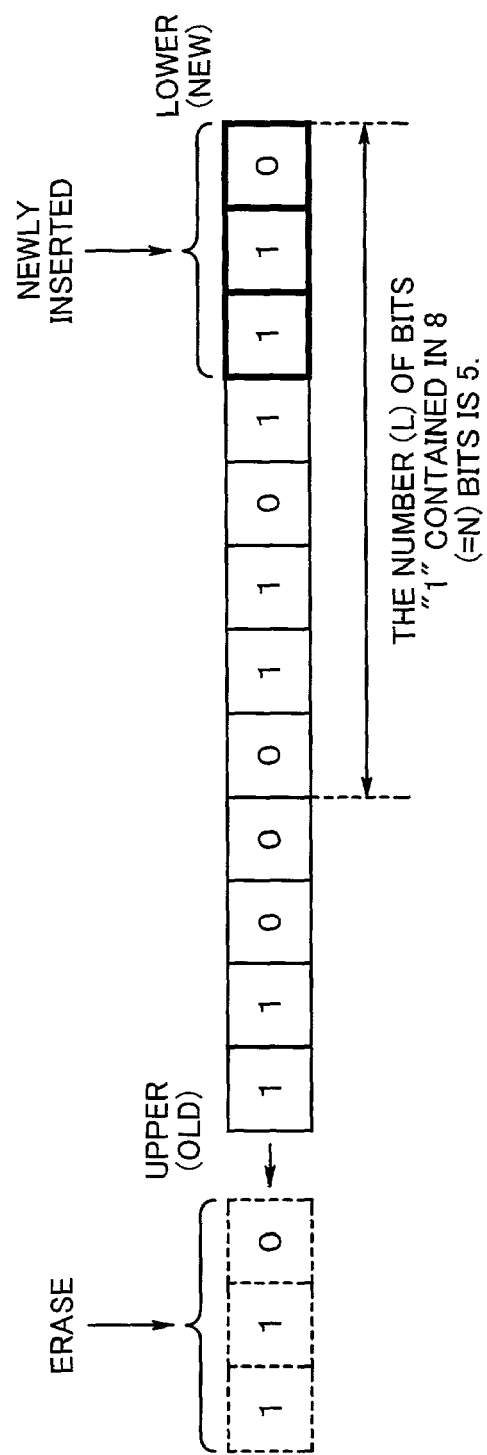

FIGS. 21(A) and 21(B) illustrate an example of the notice information management memory 22 on the control side. More particularly, FIG. 21(A) shows a content of the control-side notice information management memory 22 before the notice information is inserted, and FIG. 21(B) shows a content thereof after the notice information is inserted. The control-side notice information management memory 22 has the same number of boxes as that of the notice information management memory 14 on the terminal side, and is updated upon receiving the notice information, so that the terminal-side notice information management memories 14 and the control-side notice information management 22 have the same contents.

Upon receiving the notice information consisting of three bits, the notice information management memory 22 on the control side shifts its content for the buffer B1 to the left by three bits, and inserts items of notice information "1", "1" and "0" in the three least significant bits (FIG. 21(B)). After three-bit insertion, the N lower bits of the control-side notice information management memory 22 contain five bits of "1".

Thus, the buffer status recognizing unit 23 recognizes, from the contents of the control-side notice information management memory 22, that the buffer status of the buffer B1 is equal to 5.

As described above, by sending notice information consisting of a plurality of bits, it is possible to reduce the time necessary for transmission of notice information (namely, to reduce the number of slots used) and to notify the upper device of the buffer status for a shorter time.

As described above, in the communication system 1 of the present invention, the ONU 10 notifies the upper device of the buffer status by sending the notice information via one slot or a plurality of slots. The notice information is the value determined based on the status information about the past buffer status values and the current buffer status value.

The SLT 20 receives the notice information from the ONU 10, and recognizes the notice information on the basis of the contents of the notice information management memory 22 on the control side, which memory stores and manages the notice information.

Thus, it is possible to efficiently perform notice control of the buffer storage status and to improve the communication quality.

In the foregoing, the communication system 1 of the present invention is applied to the ONU and SLT of the optical access system. The present invention can also be applied to communication systems other than the optical access system, in which the upper device is notified of the buffer status for communications.

As has been described, the communication system according to one aspect of the invention is configured as follows. As notice information, the communication terminal device sends to the upper device the value determined based on the size relation between the status information about the past buffer status values and the current buffer status value by using one slot or a plurality of slots. The communication control device receives the notice information from the communication terminal device, and recognizes the buffer status of the communication terminal device on the basis of the contents of the notice information management memory that stores and manages the notice information on the control side. It is therefore possible to efficiently perform notice control for the buffer storage status without degrading the efficiency of transfer of user information and to improve the communication quality.

The foregoing is considered all illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication system performing communication control of information comprising:
    a communication terminal device; and
    a communication control device,
    said communication terminal device performing a terminal-side buffer management control and comprising:
    a correspondence table management unit creating, based on table forming information sent from an upper device, a correspondence table defining a correspondence between an in-buffer information amount indicating an amount of information stored in a buffer and a buffer status value indicating the in-buffer information amount in a hierarchical expression;
    a buffer status value acquiring unit referring to the correspondence table and acquiring a buffer status value of a buffer that issues a transmission event;
    a notice information setting unit comparing, with regard to an identical buffer, a size relation between status information about past buffer status values for the buffer and a current buffer status value acquired, and setting notice information on a bit basis determined by the size relation;
    a terminal-side notice information management memory storing and managing the notice information as the status information; and
    a notice information sending unit sending the notice information by using one slot or a plurality of slots to notify the upper device of the buffer status,
    said communication control device performing an office-side buffer management control and comprising:
    a table forming information sending unit creating the table forming information and sending the table forming information to said communication terminal device;
    a control-side notice information management memory receiving and managing the notice information sent by said communication terminal device; and
    a buffer status recognizing unit recognizing the buffer status of said communication terminal device from a content of the control-side notice information management memory.

2. The communication system according to claim 1, wherein:
    said communication terminal device divides the buffer into groups, and performs the terminal-side buffer management control on a group basis; and
    said communication control device performs the office-side buffer management control on the group basis.

3. The communication system according to claim 1, wherein:
    said communication terminal device performs the terminal-side buffer management control on the basis of a buffer usage ratio; and
    said communication control device performs the office-side buffer management control on the basis of the buffer usage ratio.

4. A communication terminal device communicating with an office side comprising:
    a correspondence table management unit creating, based on table forming information sent from an upper device, a correspondence table defining a correspondence between an in-buffer information amount indicating an amount of information stored in a buffer and a buffer status value indicating the in-buffer information amount in a hierarchical expression;
    a buffer status value acquiring unit referring to the correspondence table and acquiring a buffer status value of a buffer that issues a transmission event;
    a notice information setting win comparing, with regard to an identical buffer, a size relation between status information about past buffer status values for the buffer and a current buffer status value acquired, and setting notice information on a bit basis determined by the size relation;
    a terminal-side notice information management memory storing and managing the notice information as the status information; and a notice information sending unit sending the notice information by using one slot or a plurality of slots to notify the upper device of the buffer status.

5. A communication control device communicating with a terminal side comprising:
- a table forming information sending unit creating a table forming information and sending the table forming information to a communication terminal device, the table forming information being included in information necessary to generate a correspondence table defining a correspondence between an in-buffer information amount indicating an amount of information stored in a buffer and a buffer status value indicating the in-buffer information amount in a hierarchical expression,
- a control-side notice information management memory receiving and managing a notice information sent by time communication terminal device, wherein he notice information is on a bit basis determined by a size relation, being referred to the correspondence table by the communication terminal device, which is compared between status information about past buffer status values and a current buffer status value; and
- a buffer status recognizing unit recognizing a buffer status of the communication terminal device from a content of the control-side notice information management memory.

* * * * *